United States Patent [19]

Jaśniewicz et al.

[11] 4,158,249
[45] Jun. 19, 1979

[54] APPARATUS FOR SHELLING MARINE CRUSTACEA

[75] Inventors: Zbigniew Jaśniewicz, Gdańsk-Oliwa; Jan Knyszewski, Gdynia; Tadeusz Ośrodek, Gdańsk-Oliwa; Zdzisław Kiełczyński; Lech Stefański, both of Gdynia, all of Poland

[73] Assignee: Przedsiebiorstwo Polowow Dalekomorskich I Uslug Rybackich "Dalmor", Gdynia, Poland

[21] Appl. No.: 844,104

[22] Filed: Oct. 20, 1977

[30] Foreign Application Priority Data

Nov. 3, 1976 [PL] Poland .................................. 193450

[51] Int. Cl.² ............................................ A22C 29/02
[52] U.S. Cl. ...................................................... 17/73
[58] Field of Search ............................ 17/71, 48, 73; 241/86.1, 89.1, 199.12

[56] References Cited

U.S. PATENT DOCUMENTS

| | | | |
|---|---|---|---|
| 1,565,341 | 12/1925 | Umrath | 17/71 |
| 1,655,582 | 1/1928 | Umrath | 17/71 |
| 2,104,027 | 1/1938 | Dubus | 17/71 |
| 3,850,364 | 11/1974 | Robbins | 241/89.1 X |

Primary Examiner—Willie G. Abercrombie
Attorney, Agent, or Firm—Haseltine, Lake & Waters

[57] ABSTRACT

The apparatus for mechanical shelling of meat from the abdominal section of an antarctic krill employing a spinning rotor cooperating with a stationary system of cutting and chopping elements. A casing is mounted on a bed with an output passage and a lid. A rotor is disposed inside the casing and is mounted on a shaft having a working disc mounted on the rotor. A cylindrical chute mounted above the working disc has a toothed ring provided in the bottom section of this chute. The ring consists of cut-outs forming teeth, the tips of which point toward the working face of the disc. A toothed ring includes a replaceable collar on to which bars and angle bars are mounted. A multi-jet water spray is installed in the top section in the chute and the working face of disc is provided with protrusions which are identical in height, knife-edges of the protrusions are preferably directed in perpendicular to the direction of disc motion.

8 Claims, 10 Drawing Figures

APPARATUS FOR SHELLING MARINE CRUSTACEA

The present invention relates to an installation for continuous mechanical shelling of meat out of the abdominal body section of small marine crustacea, especially of fresh or defrosted, krill; irrespective of: size, species and development stage of the animal.

In accordance with the known and used installations for peeling of marine crustacea, especially of crabs, usually a spinning tool having working elements is used together with a stationary bench equipped with feed-gripping elements to hold every single processed crustacean in the working zone. Installations of this type usually comprise simple or combined drums and grip mechanisms made in the form of jaws, clamps and feed mechanisms such as intermittent-motion belts. In installations of another known type are used for processing non-fish marine animals by mechanical breaking of their bodies, for this purpose, high-speed spinning drum elements, or conical-disc elements installed in a rigid housing are usually used. These elements feeding, under the effect of centrifugal force, cause the processed material to be crushed or pressed by shelf-type, ring-type, finger-type, or cylinder-type elements which are mechanically driven.

All the above described installations for mechanical processing of non-fish marine animals/crustacea/, are not suitable for mechanical processing of the body of antarctic krill, because of its small size and weight, because the animal body is, after cooking, usually twisted into an oval.

SUMMARY OF THE INVENTION

The inventive apparatus fundamentally consists of one-piece casing mounted on a bed, the casing has an outlet passage and is provided with a sealed and removable lid. A rotor is installed inside the casing in the vertical direction and is mounted on a rotatable shaft with a remarkable moment of inertia. A working disc is detachably mounted on the rotor by means of a suitable fastening element. A cylindrical chute with circular base is located at a suitable distance above the disc along the center line of the shaft. This chute is axially shiftable in a mounting sleeve by means of an adjusting ring and a blocking (fastening) ring, these rings being preferably threaded elements.

A toothed ring is provided in the bottom section of the chute, with a row of bars fixed on a horizontal collar of the ring having a row of similarly fixed angular bars. The chute is provided with a multi-jet water spray installed in the top section of the chute with the output of the spray being adjustable. The shaft of the installation is driven by a drive mechanism, this drive mechanism preferably constitutes a non-self-locking worm gear for multiplying the speed. The working disc of the installation is provided, on its surface with plurality of protrusions arranged preferably in rows along the radii of disc. All of these protrusions are of the same height being about 0.5 to 5.0 mm. The knife-edges of these protrusions are directed in the perpendicular to the direction of motion of the disc. The working face of this disc being, in some versions concave at the $\alpha$ angle of 1° to 10°. The generating line of the concave face is a straight line. In another version, the working face of the disc has the form of concave bowl whose radius of curvature is large. The distance between the working face of the disc and the bottom edge of toothed ring of the chute is kept within 0.5 to 50 mm. The toothed ring is made in the form of a series of cut-outs, these cut-outs forming an n number of teeth whose tips point toward the working face of the disc and whose apex angle is within 120° to 60°.

In still another version, the toothed ring of the chute consists of a series of cut-outs which produce an n number of teeth separated one from the other by inter-teeth spaces. The tips of the angular bars mounted on the horizontal collar are chamfered at an angle of 10° to 30°. In certain versions of installation, both the bars and the angular bars are fixed in the horizontal collar of the chute either in more than one circle or at random, these circles are co-axial with the shaft of installation. The tips of angular bars are situated below of the outer edge of the working face of the disc, preferably at a distance of not less than 20 mm.

The inventive apparatus fulfills the anticipated effects, demonstrating, a the same time, a series of technical and utilitarian advantages. By using the present apparatus continuous processing of antarctic krill is possible, whereby mechanized processing being self-acting irrespective of the state, size and variety of processed material. This also allows, at the same time, a high output. The inventive apparatus is highly versatile because of the inter-changeability of its working elements and because of a wide range of adjustable parameters. Comparatively small demand of energy and considerable productivity is possible.

The main object of the present invention is to overcome the defects of the prior art.

Another object of the present invention is to develop a novel apparatus capable of shelling meat out of the abdominal section of antarctic krill body within a continuous mechanical process. Still another object of the invention is directed to an apparatus for shelling of meat of the antarctic krill out of its abdominal body section, in which a spinning tool operating together with a stationary system of cutting and chopping elements is employed.

Other objects and advantages of the invention will be better understood with respect to the accompanying specification, claims and drawings:

IN THE DRAWINGS

DESCRIPTION OF THE INVENTION

Figure 1:
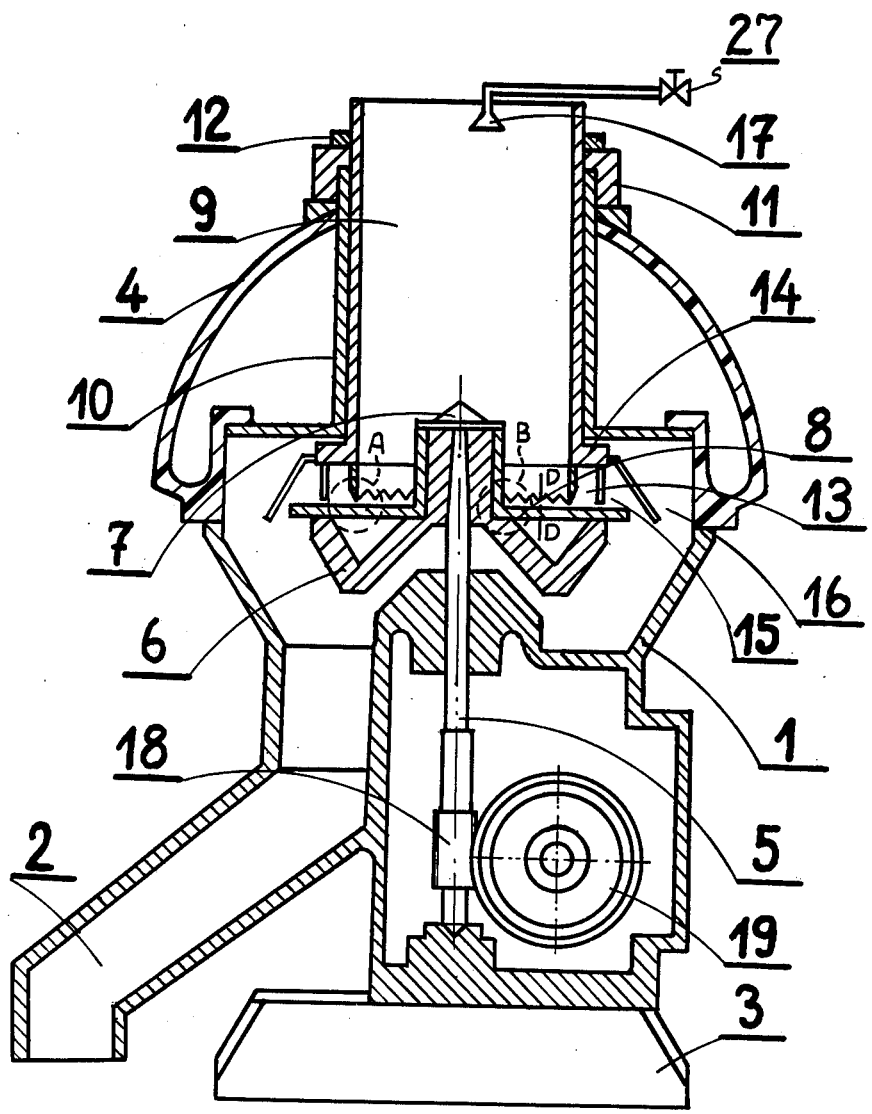
FIG. 1 illustrates in a simplified vertical section the inventive apparatus.
Figure 2:
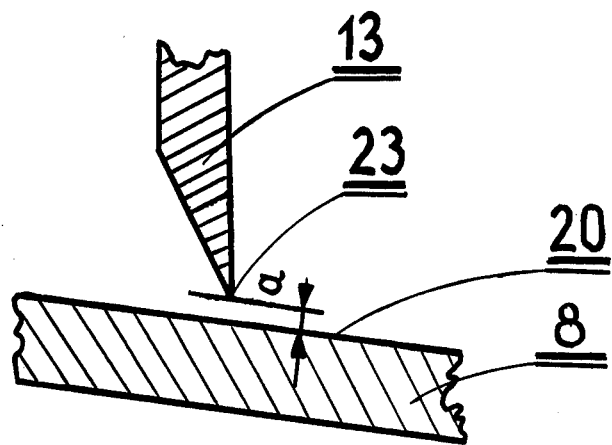
FIG. 2 illustrates the detail A shown in FIG. 1.
Figure 3:
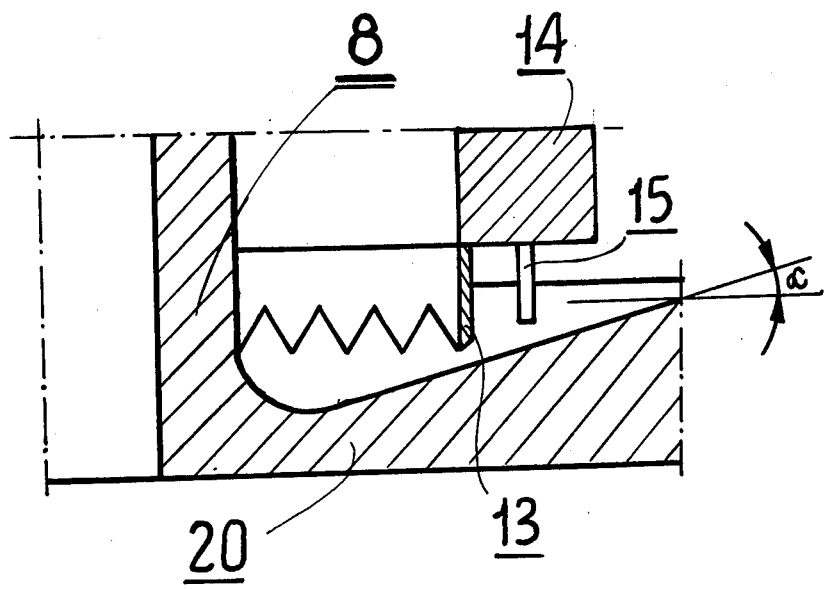
FIG. 3 illustrates the detail B shown in FIG. 1.
Figure 4:
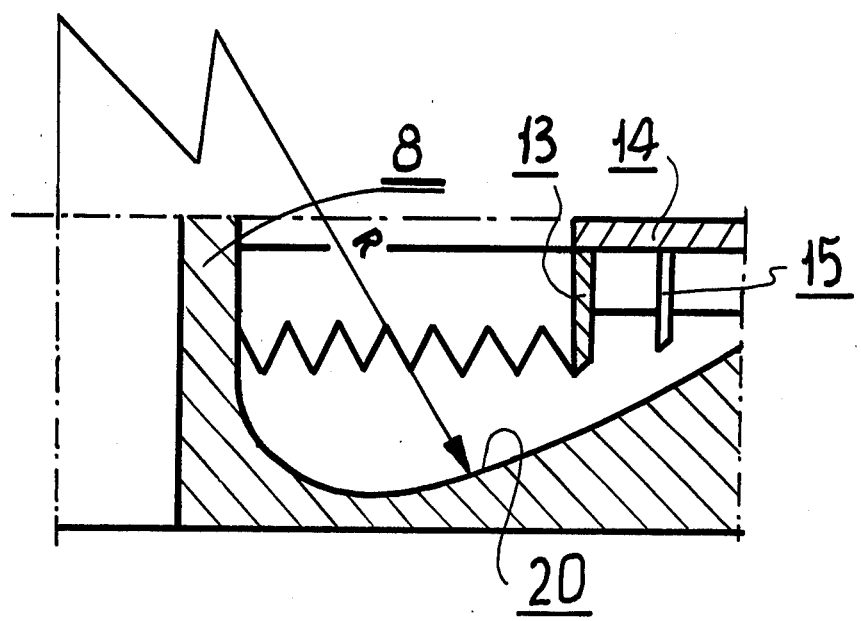
FIG. 4 illustrates another form of the detail B shown in FIG. 1.
Figure 5:
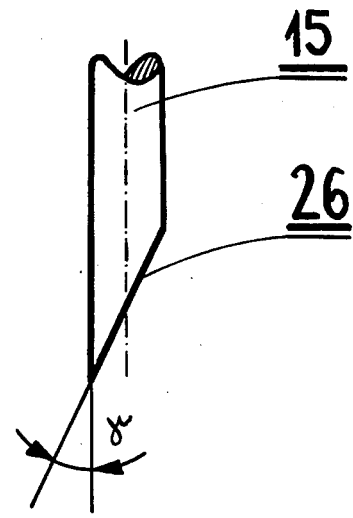
FIG. 5 illustrates in detail the tip of the bar shown in FIG. 1.
Figure 6:
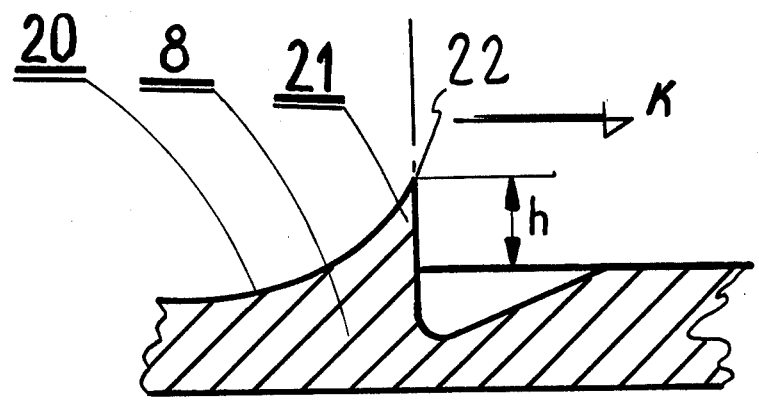
FIG. 6 illustrates the construction detail of a protrusion on the working disc, in a section along plane D-D shown in FIG. 1.

The invention fundamentally consists of a casing 1, preferably formed of a one-piece casting having at least a single outlet passage 2. The casing 1 is mounted on a bed 3 and is provided with a rigid sealable and removable lid 4. A rotor 6 is installed inside the casing 1 in the vertical direction, the rotor being mounted on a solid rotable shaft 5. The rotor is so shaped so that a moment of inertia of high value is produced. A working disc 8 is mounted on the rotor 6 preferably by means of a threaded fastening element 7, the working disc being replaceable. A cylindrical chute 9 with circular base, is located at a suitable distance, above the disc along the centre line of the shaft 5. The chute is axially shiftable in a mounting sleeve 10 by means of an adjustable rotable ring 11, and by means of identical retaining ring 12, the rings are preferably threaded elements.

A toothed ring 13 is provided in the bottom section of the chute 9, with bars 15 and with angular bars 16 fixed on a horizontal, preferably replaceable, collar 14. The bars and the angular bars are preferably installed in a circle co-axial with the shaft 5. The chute 9 of the installation is provided with a multi-jet water spray 17 installed in the top section of the chute, the output of this spray being adjustable, the spray being made in the form of e.g. a flat sieve. The shaft 5 is driven by a drive mechanism which is preferably a non-self-locking worm transmission consisting of a worm 18 and worm-wheel 19. The transmission multiplies the speed to the order of 1,000 to 12,000 r.p.m. The working disc 8 of the installation is a conventional element made to withstand the forces resulting from high rotational speed, and is provided, on its working face 20, with a plurality of protrusions 21 arranged preferably in many rows along the radii of disc 8. All of the protrusions have the same height h within 0.5 mm to 5 mm. Knife-edges 22 of the protrusions are preferably directed in perpendicular to the direction k of motion of disc 8.

In another version of the inventive apparatus, the working face 20 of disc 8 is concave at an $\alpha$ angle of 1° to 10°, preferably at an angle of 5°, the generating line of the said concave face being a straight line.

In still another version of the inventive apparatus, the working face 20 of disc 8 has the form of a concave bowl, the radius R of the curvature of the bowl being large, the mid point of this radius being in line with the centre line of shaft 5. The installation is adjusted in such a way that the distance between the working face 20 of disc 8 and a bottom edge 23 of the toothed ring 13 is, in all versions of installation, within the range of 0.5 mm to 5.0 mm; the distance being preferably 5.0 mm. The toothed ring 13 of the chute 9 consists of a series of cut-outs, said cut-outs forming a number n of teeth 24, and the tips of the teeth pointing toward the working face 20 of disc 8, the apex angle $\beta$ of the teeth being within the range of 90° to 45°, and preferably 45°.

In yet another version of the inventive apparatus the toothed ring 13 also consists of a series of cut-outs, sid cut-outs forming a number of n teeth 24, the teeth being separated one from the other by inter-teeth spaces 25, the tips of teeth 24 pointing, in the same way, toward the working face 20 of disc 8. The apex angle $\beta$ of the teeth being within the range of 90° to 30°, with the apex angle being preferably 60° in an installation made in this version.

Figure 9:
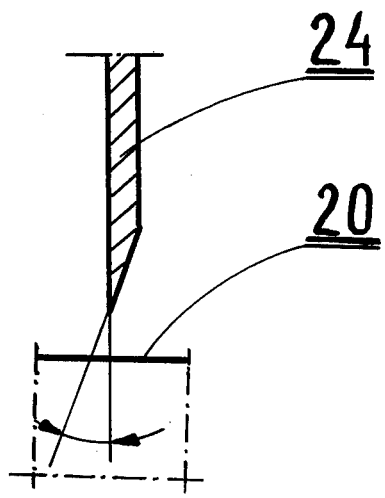
FIG. 9 illustrates the tooth of the toothed ring in a sectional view along the plane E indicated in FIG. 7 and in FIG. 8.
Figure 7:
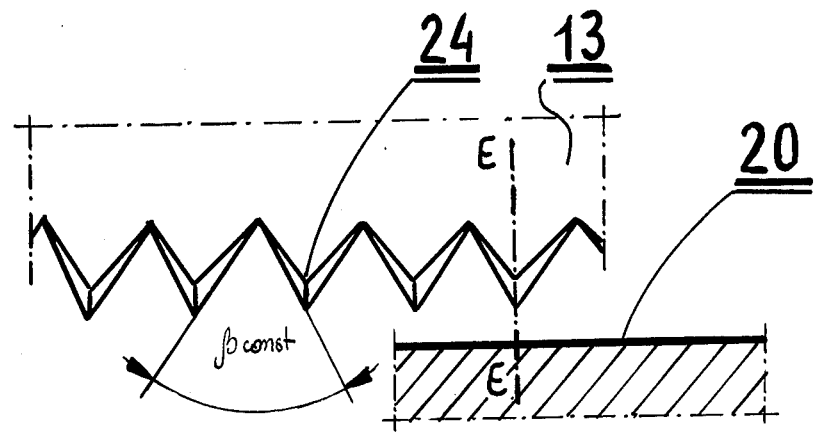
FIG. 7 illustrates the cutting elements in a developed view from direction C indicated in FIG. 1.
Figure 8:
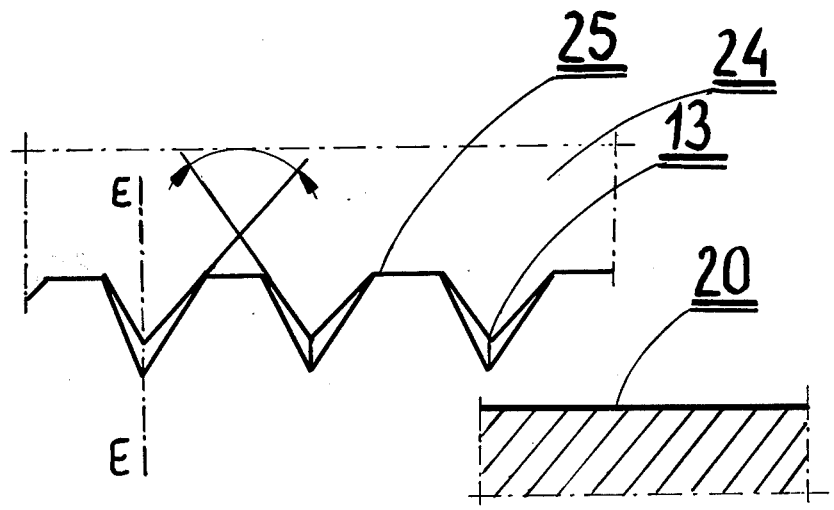
FIG. 8 illustrates another version of the cutting elements from direction C indicated in FIG. 1.
Figure 10:
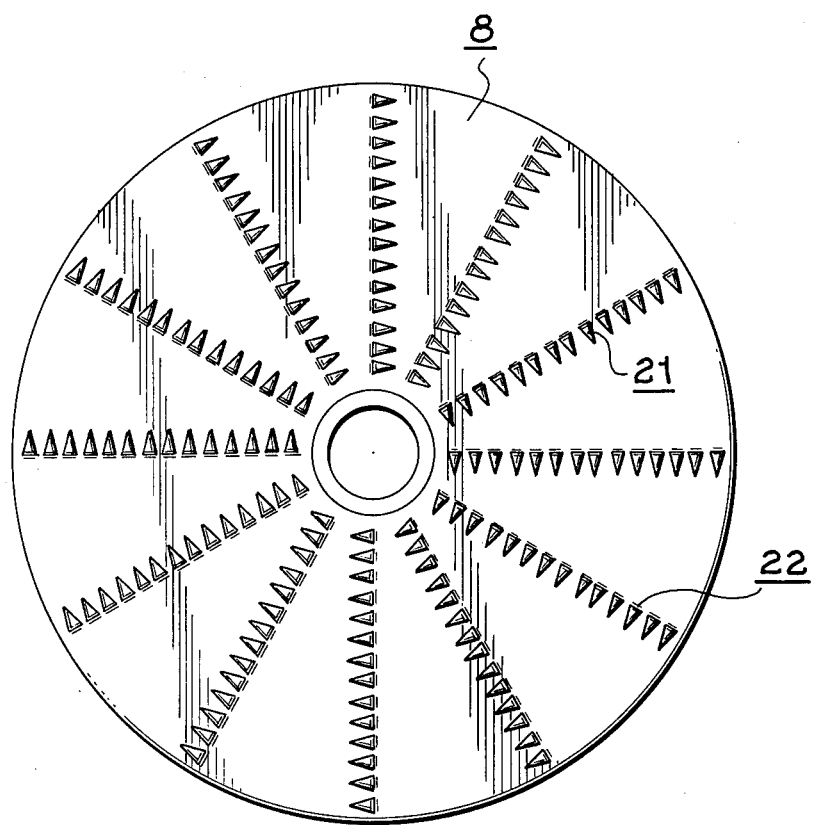
FIG. 10 illustrates protrusions on the disc shown in radial rows.

The teeth 24 are bent, see FIG. 9 - section E—E, at an angle $\phi = 10°$ to 20°, and are, preferably at an angle of 15°. The tips of bars 15 are chamfered, a chamfer plane 26 being inclined at an angle $\gamma$ within the range of 10° to 30°, preferably at an angle of 15°.

In another version of the inventive apparatus the bars 15 as well as the angular bars are fixed in a replaceable collar 14, either on more than one circle or at random. The circles being co-axial with the centre line of the shaft 5. The tips of angular bars 16 are situated below of the outer edge of working face 20 of disc 8, preferably at a distance of not less than 20 mm.

The inventive apparatus is applicable in the fishing industry, in industrial lines for processing of antarctic krill both in fishing grounds and at processing boats and plants on land.

Many modifications and variations of the present invention are possible in light of the above teachings. It is, therefore, to be understood that within the scope of the appended claims, the invention may be practiced otherwise than as particularly described.

What is claimed:

1. An apparatus for shelling meat of marine crustacea, especially of antarctic krill, employing a highspeed rotor disposed vertically in a casing, said rotor operating jointly with an open container containing the material to be processed, said container having a passage for discharge, under the effect of gravity, of processed material, wherein: said casing having a discharge passage mounted on a bed, a removable and sealed lid disposed on said casing, said rotor being installed on a rotatable shaft, and being formed to have a high moment of gravity; a working replaceable disc installed on the said rotor by means of a fastening element; a cylindrical chute being installed above the said working disc at a certain distance and in line with the center line of said shaft, the base of the said chute being circular; said chute being installed vertically and shiftably disposed in a mounting sleeve by means of a retaining ring, means retaining said chute being formed of threaded elements; toothed ring means being provided in the bottom section of said chute; bars and angle bars being mounted on a horizontal collar of the said toothed ring means, the tips of the said bars being preferably chamfered; said bars being further defined by a plane of chamfer forming an apex angle $\gamma$ within the range of 10° to 30°, the tips of said angle bars being situated below the outer edge of the working face of the disc, preferably at a distance of not less than 20 mm.

2. An apparatus for shelling meat of marine crustacea, especially of antarctic krill, employing, a rotatable disc for ejection crustacea therefrom by centrifugal force; a chute mounted above said disc for delivering crustacea onto said working disc, a toothed ring provided at the bottom of said chute for cutting crustacea shells; bars mounted to said chute for removing shells from the meat of crustacea; and angle bars cooperating with said bars for deflecting a mixture of meat and of shells to an outlet passage of a casing housing said disc, wherein: said disc is mounted horizontally on a rotor fastened to shaft means and is connected to a drive means assembly; said chute is vertically disposed above the disc within a sleeve permitting adjustment of the distance between the chute and said disc and is retained within said sleeve by means of a threaded retaining ring; said toothed ring being disposed to surrounding the axis of rotation of said disc, and said bars are positioned to annularly surround said toothed ring and are mounted on a collar of said chute, said angle bars in turn annularly surround said bars; said bars being further defined by chamfered surfaces forming an apex angle to the vertical within the range of 10° to 30°; and tip portions of said angle bars being situated below the outer edge of a working face of said working disc, at a distance of not less than 20 mm.

3. An apparatus as claimed in claim 2, wherein: said chute being provided with a multi-jet water spray disposed at a top section of said chute, said jet spray having means for adjusting the output thereof.

4. An apparatus as claimed in claim 2, wherein: said shaft is driven by a drive mechanism means being preferably a non-self-locking worm transmission with worm and worm-wheel and being further defined as a multiplying transmission.

5. An apparatus as claimed in claim 2, wherein: a working face of said disc being provided with a plurality of protrusions, said protrusions being preferably identical as to their height and formed within the range of from 0.5 to 5.0 mm; said protrusions being preferably arranged in rows along the radii of disc, and knife-edges of said protrusions being preferably directed in a perpendicular direction to the direction of disc motion.

6. An apparatus as claimed in claim 2, wherein: said disc has a working face disposed perpendicular to the axis of rotation, and being preferably concave at an angle $\alpha$ formed within the range of 1° to 10°, and a generating line of the said face being a straight line; said working face being preferably shaped in the form of a bowl having a large radius of curvature.

7. An apparatus as claimed in claim 2, wherein: a distance between said working face of working disc and a bottom edge of said toothed ring being within the range of 0.5 mm to 5.0 mm.

8. An apparatus as claimed in claim 2, wherein: said toothed ring being formed of a series of cut-outs forming a designated number of teeth, said teeth having end portions pointing toward said working face of working disc; an apex angle $\beta$ of the said end portions being within the range of 90° to 45°, and further being defined by pointed end surfaces at an angle $\phi$ being 10° to 20°, said teeth being preferably separated one from the other by interteeth spaces.

* * * * *